(12) United States Patent
Shimizu

(10) Patent No.: US 6,470,029 B1
(45) Date of Patent: Oct. 22, 2002

(54) BANDWIDTH CONTROL METHOD IN A NETWORK SYSTEM

(75) Inventor: Hiroshi Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/092,938

(22) Filed: Jun. 8, 1998

(30) Foreign Application Priority Data

Jun. 9, 1997 (JP) ................................................ 9-151281

(51) Int. Cl.$^7$ ................................ H04J 3/16; H04J 3/18
(52) U.S. Cl. ...................................... 370/468; 370/477
(58) Field of Search ................................ 370/468, 477, 370/465, 397, 399, 395, 409, 396, 398, 905, 231, 232, 233, 234, 235

(56) References Cited

U.S. PATENT DOCUMENTS 5,467,348 A  11/1995  Fujii et al.

FOREIGN PATENT DOCUMENTS

| EP | 0 675 617 A | 10/1995 |
| EP | 0 693 840 A1 * | 1/1996 |
| JP | 3-503709 | 8/1991 |
| JP | 4-150438 | 5/1992 |
| JP | 4-151933 | 5/1992 |
| JP | 5-130124 | 5/1993 |
| JP | 6-46082 | 2/1994 |
| JP | 6-53962 | 2/1994 |
| JP | 9-18515 | 1/1997 |
| JP | 9-149046 | 6/1997 |

OTHER PUBLICATIONS

Bahk et al, "Preventative Congestion Control Routing in ATM Networks," May 1994, IEEE, pp. 1592–1599.*
Park, "Self–Organized Multi–Class Qos Provision for ABR Traffic in ATM Networks," Mar. 1996, IEEE, pp. 446–453.*
European Search Report dated Nov. 11, 1999.
Tsang, et al., "A Two–Level Flow Control Scheme for ABR Traffic in ATM Networks" IEICE Trans. Commun., vol. E79–B. No. 11, Nov. 1996, pp. 1633–1640.
Japanese Office Action dated Aug. 17, 1999, with partial translation.
Users Manual of "u PD98401 Local ATM SAR Chip" published by Nippon Electric Corporation, Section 3.7. Abstract.

* cited by examiner

Primary Examiner—William Luther
(74) Attorney, Agent, or Firm—McGinn & Gibb, PLLC

(57) ABSTRACT

A bandwidth control method is disclosed that allows management on the network manager side of bandwidths to be reserved. Between each of subscriber nodes, maximum bandwidths are set for each node pair in which one subscriber node is taken as the source and the other is taken as the destination; and for the data transfer from a source subscriber node to a destination subscriber node, for each of links from the source subscriber node to a trunk node, links between trunk nodes, and links from a trunk node to the destination subscriber node, bandwidths are set to correspond to the sum of maximum bandwidths of subscriber node pairs that carry out data transfer over these links. For data transfer from trunk nodes to other trunk nodes or to the destination subscriber node, virtual channels are organized by route and made virtual channel groups, and bandwidths are reserved based on the virtual channel groups.

19 Claims, 4 Drawing Sheets

| TRANSMISSION ORIGIN / DESTINATION | 10 | 20 | 30 | 40 |
|---|---|---|---|---|
| 10 |   |   | 8 | 2 |
| 20 | 1 |   | 5 | 1 |
| 30 | 5 | 3 |   | 3 |
| 40 | 4 | 6 | 1 |   |

BANDWIDTH CONTROL METHOD IN A NETWORK SYSTEM

BACKGROUND OF THE INVENTION

1. Field of the Invention

The present invention relates to a bandwidth control method and a bandwidth control system in a network that interconnects by way of a plurality of trunk nodes each of a plurality of subscriber nodes that in turn accommodate a plurality of subscribers.

2. Description of the Related Art

RSVP (ReSource reservation Protocol) has been used as a communication control method for reserving bandwidth. In this communication control method, a bandwidth request (a request to reserve a transmission bandwidth) from a terminal is transmitted by way of, for example, an interposed router to the server that is the communication partner. Upon receiving the bandwidth request from the terminal, the interposed router transfers the request on to the next router while reserving a transmission bandwidth on the path. In this way, the entire transmission bandwidth on the path is reserved from the terminal to the server. Upon receiving the request signal from the terminal, the server determines whether acceptance is possible, and if acceptance is possible, sends a response signal indicating this state on the path for which the transmission bandwidth is reserved. This response signal follows the path taken by the request signal to reach the terminal at which the request originated.

Another method is a bandwidth reserving method used in an ATM (A synchronous Transfer Mode) network. Explanation of this method is presented with reference to a typical network shown in FIG. 1.

The network shown in FIG. 1 is made up of subscribers 11–13, 21–23, 31–33, and 41–43 (for example, residential and company subscriber servers); subscriber nodes 10, 20, 30, and 40 that accommodate these subscribers; and trunk nodes 50, 60, 70, and 80 that connect these subscriber nodes to each other.

Subscribers 11–13 are accommodated within subscriber node 10, subscribers 21–23 are accommodated within subscriber node 20, subscribers 31–33 are accommodated within subscriber node 30, and subscribers 41–43 are accommodated within subscriber node 40. Subscriber nodes 10 and 20 are link ed to each other by way of trunk node 50, subscriber nodes 30 and 40 are linked to each other by way of trunk node 60, and trunk nodes 50 and 60 are linked to each other by way of trunk nodes 70 and 80.

As an example, when guaranteeing a line of bandwidth Wa from subscriber node 10 to subscriber node 40 by the bandwidth control of the prior art, a virtual channel of bandwidth Wa is set at subscriber node 10 on each of links (trunk line) 51, 75, 78, 86, and 64 up to subscriber node 40. In this way, bandwidth is guaranteed by placing in correspondence subscriber node pairs (pairs of transmission source subscriber nodes and destination subscriber nodes) and defining a virtual channel within each link that joins the trunk nodes.

However, the above-described prior art has several problems as described herein below.

In a method in which bandwidth is reserved between subscribers by using RSVP, determination of whether a bandwidth is assigned or not is realized on the subscriber's server and thus cannot be managed on the network side. As a result, there is the problem that, even if it is desired, a particular subscriber cannot reserve network resources such as the bandwidth of a transmission line if the resources are already reserved by another subscriber.

Moreover, a fee-charging service has been difficult to establish using RSVP because authority such as bandwidth management is entrusted to subscribers. Due to the above-described points, RSVP has been difficult to use as a protocol for bandwidth reservation in a public network or carrier network.

Reserved bandwidths can be managed on the network side by a method that uses ATM, but the number of virtual channels to be processed increases at higher-ranking trunk nodes such as trunk nodes 70 and 80 in FIG. 1 where multiple virtual channels are concentrated. This gives rise to the problem of higher costs of the system because intelligent, high-performance trunk nodes are required at higher-ranking trunk nodes where the number of virtual channels increases for the purpose of setting, managing and bandwidth-guaranteeing processes of guaranteed bandwidths. Furthermore, the number of subscriber nodes becomes limited as the number of virtual channels increases. A concrete explanation of this limitation on the number of subscriber nodes follows herein below.

FIG. 2 is a block diagram showing an interface of the prior art that includes a peak-rate bandwidth control capability. Data in which the virtual channel number and reserved bandwidth value are placed in correspondence are multiple-recorded in bandwidth control data memory 94. Bandwidth control circuit 92, which has a scheduler capability, accesses bandwidth control data memory 94 and transmission cell buffer 91 in which cells to be transmitted are stored, and transmits by way of transmission interface circuit 93 at the peak rate (maximum bandwidth) set at cells to be transmitted (Refer to section 3.7 of the Users Manual of "μPD98401 Local ATM SAR Chip" published by Nippon Electric Corporation).

If the number of virtual channels that can be controlled by bandwidth control circuit 92 is, for example, 32,000, this type of interface can handle communications on the order of 30,000 partner subscriber nodes at subscriber node 10, but at higher-ranking trunk nodes such as trunk nodes 70 and 80, communication can be handled for only about 180 subscriber node pairs, i.e., a number equal to the square root of 32,000, (in the case of a logical mesh). Thus, a significant limit exists for the bandwidth reservation channels on the subscriber nodes.

In addition to the above-described point in methods using ATM, a bandwidth control data memory of large volume becomes necessary as the number of virtual channels increases, and this leads to the problems of both greater size and greater cost of the device.

SUMMARY OF THE INVENTION

The first object of the present invention is to provide a bandwidth control method and bandwidth control system that allows the management of bandwidths to be reserved to be performed on the network administration side.

The second object of the present invention is to provide a bandwidth control method and bandwidth control system that allow simple management and setting of guaranteed bandwidths regardless of increases in the number of channels for which bandwidths are to be reserved.

To achieve the above-described objects, the bandwidth control method of the present invention is a bandwidth control method that is carried out in a network in which a plurality of subscriber nodes accommodating a plurality of subscribers are each connected to each other by trunk nodes;

and that includes: for the data transfer from subscriber nodes to trunk nodes, setting virtual channels to each of destination subscriber nodes that are relayed by way of the trunk nodes and reserving bandwidths based on the virtual channels; and for the data transfer from trunk nodes to other trunk nodes or to destination subscriber nodes, establishing virtual channel groups according to route by organizing virtual channels that are relayed by the transfer nodes and reserving bandwidths based on the virtual channel groups.

In the above-described cases, the bandwidth control method of the present invention may further include:
between each of the subscriber nodes, setting a maximum bandwidth for each node pair in which one subscriber node is taken as the source and the other is taken as the destination; and
for the data transfer from the source subscriber node to the destination subscriber node, for each of the links from the source subscriber node to a trunk node, between trunk nodes, and from a trunk node the destination subscriber node, setting bandwidths corresponding to the sum of maximum bandwidths of subscriber node pairs through which data transfer is carried out.

In addition, the bandwidth control method of the present invention may further include:
between each of the subscribers, setting maximum bandwidth for each subscriber pair wherein one subscriber is taken as the source and the other is taken as the destination; and
for the data transfer from a source subscriber node to a destination subscriber node, for a link from a source subscriber node to a trunk node, setting bandwidth corresponding to the sum of the maximum bandwidth of the subscriber pair through which data transfer is carried out.

In addition, the bandwidth control method of the present invention may further include giving priority to data transfer from a specific subscriber node for communication having reserved bandwidth during transmission between trunk nodes and from a trunk node to a destination subscriber node. In such cases, for links between trunk nodes and links from trunk nodes to the destination subscriber node, the bandwidth control method of the present invention may further include both setting virtual channels having bandwidths equal to or greater than the sum of communication having reserved bandwidth, and, of communication that uses the virtual channel, giving a low order of priority to communication that loses reserved bandwidth for the purpose of control that gives priority to data transfer from the specific subscriber node.

In addition, the bandwidth control method of the present invention may further include, for links from a subscriber node to a trunk node, assigning a virtual channel to data transfer from a specific subscriber to a subscriber that is accommodated in the same destination subscriber node.

In any of the above-described cases, an a synchronous transfer mode virtual channel may be used as the virtual channel.

To achieve the above-described object, the bandwidth control system of the present invention includes a network in which a plurality of subscriber nodes accommodating a plurality of subscribers are connected to each other by way of trunk nodes; and
subscriber nodes are configured such that virtual channels are set by destination subscriber node and bandwidth is reserved based on the virtual channels, trunk nodes are configured such that virtual channels are organized by route as virtual channel groups and bandwidth is reserved based on the virtual channel groups.

In the above-described case, the bandwidth control system of the present invention may be configured such that a subscriber node includes:
a plurality of subscriber interface circuits that carry out communication with subscribers;
a first trunk circuit that carries out packet communication with a trunk node by setting a virtual channel for each subscriber node through which communication is relayed by way of the trunk node, reserving bandwidth based on the virtual channels, and using corresponding a virtual channel;
a first switch circuit that switches communication connections between the plurality of subscriber interface circuits and between these subscriber interface circuits and the first trunk circuit; and
a first control means that, in addition to controlling communication connections by the switch circuit, manages the virtual channels and sets the capacity of reserved bandwidths;

and the trunk node includes:
a plurality of second trunk circuits that organize by route the virtual channels that are relayed between other trunk nodes or destination subscriber nodes and through that trunk node and make them virtual channel groups, and reserve bandwidth based on the virtual channel groups;
a second switch circuit that switches communication connections between the plurality of second trunk circuits; and
a second control means that, in addition to controlling communication connections by the second switch circuit, manages the virtual channel groups and sets the number of reserved bandwidths.

Further, in this bandwidth control system, the first trunk circuit that makes up a subscriber node may be configured to include:
first storage means in which is stored the maximum bandwidth information of each virtual channel that is set by destination subscriber node; and
virtual channel setting means that sets the virtual channels of the maximum bandwidth information stored in the first storage means;
and the second trunk circuit that makes up trunk nodes may be configured to include:
second storage means in which are stored the maximum bandwidth information of virtual channel groups organized by route; and
virtual channel group setting means that sets virtual channel groups in accordance with the maximum capacity of bandwidths stored in the second storage means.

Furthermore, in this case, the second trunk circuit that makes up the trunk node may also be configured to include:
a distribution means that distributes transmission from a specific subscriber nodes and transmission from other subscriber nodes; and
transmission means that, for transmission that has been distributed at the distribution means, gives priority to transmission from specific subscriber nodes.

In the present invention as described herein above, bandwidths to be reserved can be easily monitored on the network administrator side because bandwidth control is carried out per route between trunk nodes and between a trunk node to destination subscriber nodes.

In addition, in spite of increases in the number of channels for which bandwidth is to be reserved, at least one channel between these nodes is sufficient because bandwidth control is carried out per route between trunk nodes and from trunk nodes to terminating subscriber nodes as described herein above, thereby eliminating limits on the number of subscribers nodes brought about by increase in the number of virtual channels as in the prior art. As a result, there is no need for an intelligent, high-performance trunk node at higher-ranking trunk nodes, and accordingly, there is no cause for a more costly system.

Moreover, as described herein above, since there is no increase in the number of virtual channels between trunk nodes and from trunk nodes to terminating subscriber nodes, there is no need for a large-capacity memory for the volume of bandwidth control data memory, and there is no concern that a device must increase in size or cost.

In the present invention moreover, between each of the various subscribers, maximum bandwidth is set for subscriber pairs wherein one subscriber is designated as the source and the other as the destination, and for the data transfer from a source subscriber node to the destination subscriber node, the bandwidth for links from source subscriber node to a trunk node is set corresponding to the sum of the maximum bandwidths of the subscriber pairs through which data transfer is carried out, and as a result, bandwidth reservation can be realized between subscribers.

As described herein above, the present invention allows the network manager to actively manage, set, and guarantee the setting of bandwidths for links between a subscriber node to a trunk node or from a trunk node to a destination subscriber node, and as a result, in contrast to RSVP, the present invention can be applied to a fee-based service.

Further, because continued transmission at reserved peak rate is rare, unused surplus bandwidths can be assigned for communication for which bandwidths are not reserved, thereby allowing the provision of low fees for non-reserved communication.

Finally, a single virtual channel of reserved bandwidth between trunk nodes or from a trunk node to a destination subscriber node is sufficient, and even if the network scale should become large, limits in the bandwidth reserved channels at subscriber nodes that occurred in examples of the prior art can be eliminated and a small-scale and economical configuration can be provided.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Embodiments of the present invention are next described with reference to the accompanying figures.

Figure 1:
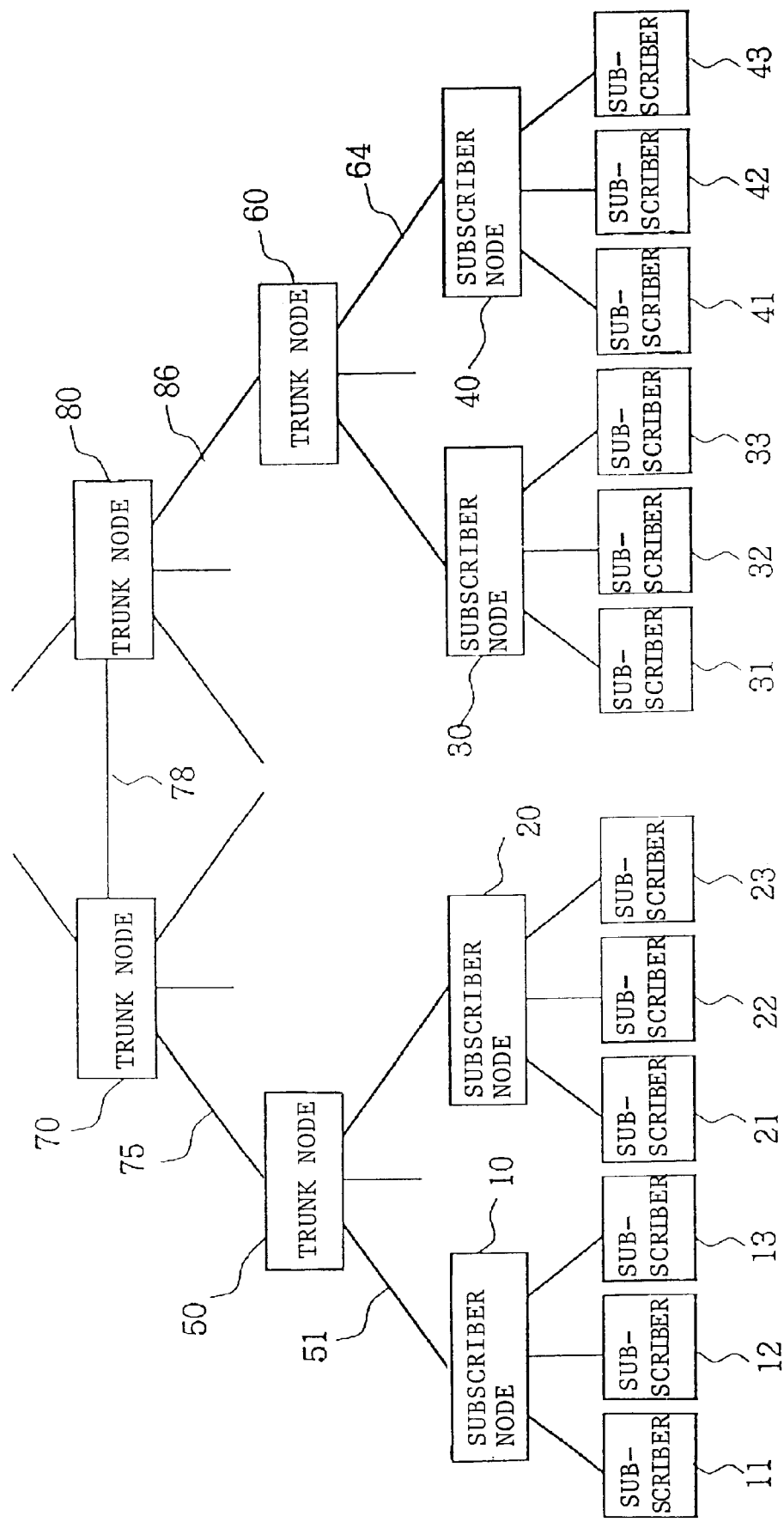
FIG. 1 is a block diagram showing one example of the configuration of a typical network which is applied to the present invention.

A network such as the one shown in the previously described FIG. 1 can be applied as a network in which the bandwidth control method of the present invention is applied. Explanation of the configuration of the network is here omitted, and explanation is presented regarding bandwidth control with reference to FIG. 3.

Figures 3, 4:
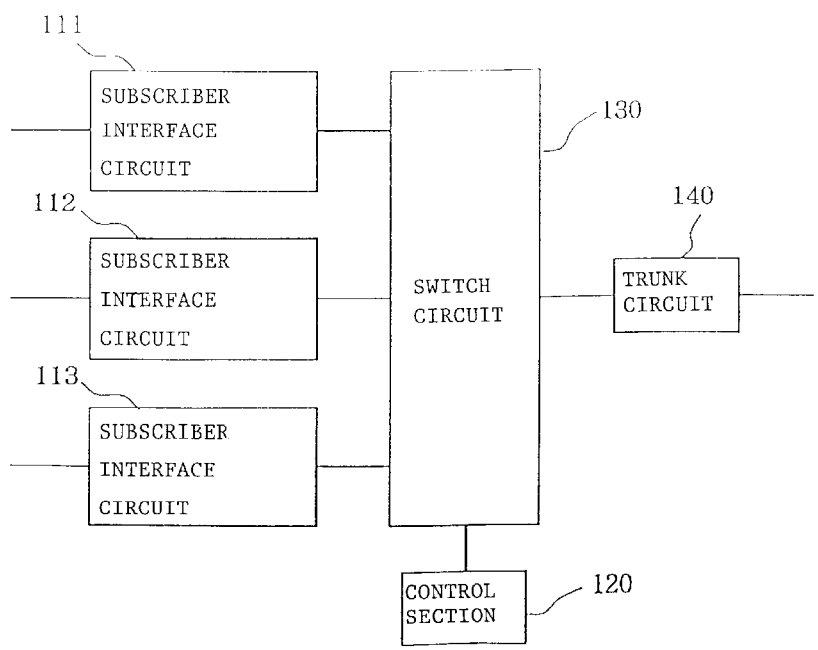
FIG. 3 illustrates one embodiment of the bandwidth control method of the present invention, and shows reserved bandwidth (maximum bandwidth) between each subscriber node in the form of a table.
FIG. 4 is a block diagram showing an example of the configuration of a subscriber node used in the present embodiment.

FIG. 3 illustrates a bandwidth control method according to one embodiment of the present invention, and shows the reserved bandwidth (maximum bandwidth) between each of subscriber nodes 10–40 in the form of a table. For the sake of simplifying the explanation, traffic between subscriber nodes other than subscriber nodes 10–40 is here made zero.

Virtual channels from subscriber node 10 to subscriber nodes 20, 30, 40 are configured in link 51, in which bandwidths whose capacity are 1, 5 and 4 are reserved to the respective channels. Since the traffic flowing into the virtual channels never exceeds the reserved bandwidths, the bandwidth for each source/destination subscriber node pair can be guaranteed on line 75 as shown in FIG. 3 by reserving the total bandwidth of 18 which is the sum of reserved bandwidths for subscriber nodes 10, 20 to subscriber nodes 30, 40. Similarly, by reserving the total bandwidth of 18 for links 78 and 86, the bandwidth is guaranteed to the source/destination subscriber node pairs.

For the traffic coming from other input links and going out to a certain output link at a trunk node, the traffic bandwidth is added to the previous reserved group bandwidth of the output link. For example, at line 64, the bandwidth flowing to link 64 from link 86 is 10 in capacity as a result of subtracting the reserved bandwidth of 8 for the link to subscriber node 30 (bandwidth of 8=bandwidth of 5 from subscriber nodes 10 to subscriber node 30 +bandwidth of 3 from subscriber node 20 to subscriber node 10). Since the bandwidth flowing to subscriber node 40 from subscriber node 30 is 1 in capacity, the reserved bandwidth capacity to be configured is 11 which is the sum of above-mentioned bandwidths 10 and 1. In other words, the link reserved capacity to be configured is only the sum of maximum bandwidths of all subscriber node pairs passing through the link 64 (i.e. the sum of reserved bandwidth from each subscriber nodes 10, 20 and 30 towards subscriber node 40 in FIG. 3).

In this way, the link bandwidth to be reserved can be managed as a group bandwidth instead of individual bandwidths, which causes the control and management means to be simpler.

In this embodiment as described herein above, for trunk nodes 50, 60, 70, and 80, virtual channels are organized by route as virtual channel groups, bandwidths are reserved in units of virtual channel groups, and the sum of bandwidths set at each virtual channel is the bandwidth of that virtual channel group.

In the bandwidth control method of this embodiment as described herein above, inflow traffic to the trunk system is controlled at an originating subscriber node according to the destination subscriber node, and as a result, reservation of the bandwidth of each individual unit of traffic according to destination subscriber node is not lost even though organized by route and bandwidth-controlled as a group at trunk nodes.

In addition, a control device can be easily realized because bandwidth control is performed in route units between trunk nodes and from trunk nodes to terminating subscriber nodes and bandwidth control by destination is not necessary. Explanation is next presented regarding an actual example of the configuration of a subscriber node that can realize the bandwidth control described herein above.

FIG. 4 is a block diagram showing an example of the configuration of a subscriber node used in the present embodiment. This subscriber node is made up of: subscriber interface circuits 111–113 at which packet communication is carried out with each subscriber; control section 120; switch circuit 130 that switches the output destinations of received packets; and trunk circuit 140. Each of subscriber interface circuits 111–113 and trunk circuit 140 are provided with address tables that establish correspondences between destination addresses and output port numbers—destination nodes.

Each of subscriber interface circuits 111–113 refers to the address table according to the destination address of the received packets upon receiving a packet signal from a subscriber, specifies the output port number, and sends the data to switch circuit 130.

Switch circuit 130 performs switching based on the output port number, turning the signal back to another subscriber interface circuit if it is an intra-office return, and supplying the signal to trunk circuit 140 if it is outside communication. Trunk circuit 140 consults the address table by the destination address of the packet signal and specifies the destination subscriber node, and sends to the higher-ranking trunk node using the corresponding virtual channel. Control section 120 administrates the address tables of each of subscriber interface circuits 111–113 and trunk circuit 140, manages virtual channels, and sets the reserved bandwidths.

As for a packet signal received from trunk node at trunk circuit 140, the output port number is specified by the destination address and the packet signal is supplied to the prescribed subscriber interface circuit by way of switch circuit 130.

Examples of the known art may be employed as the bandwidth control of the virtual channels in the above-described trunk circuit 140. For example, a trunk circuit having a circuit configuration such as the interface shown in FIG. 2 described herein above may be used. In this case, the reserved bandwidth at each virtual channel accorded to each destination subscriber node by control section 120 is stored in bandwidth control data memory 94. Bandwidth control circuit 92, which is a virtual channel setting means, reserves the bandwidth of virtual channels in accordance with reserved bandwidths stored in bandwidth control data memory 94. Cells to be sent from each subscriber interface circuit are transferred to transmission cell buffer 91 by way of switch circuit 130, and are transmitted by way of transmission interface circuit 93 under the control of bandwidth control circuit 92.

This subscriber node can provide final (destination) ground number communication wherein bandwidths can be set only to the number set in bandwidth control data memory 94. In concrete terms, ATM virtual channels (VC) may be allotted corresponding to destination subscriber nodes, and bandwidth control may be carried out by virtual channel (VC). In addition, the interface shown in FIG. 2 corresponds to peak-rate control at a cell base, but peak-rate control corresponding to packet signals can also be easily realized if packet signals are transmitted in a form divided into ATM cells. In the bandwidth control method of this embodiment, a means that can limit the peak rate for cells or packet signals may be employed, but the method of realizing this control is not specified.

Figure 5:
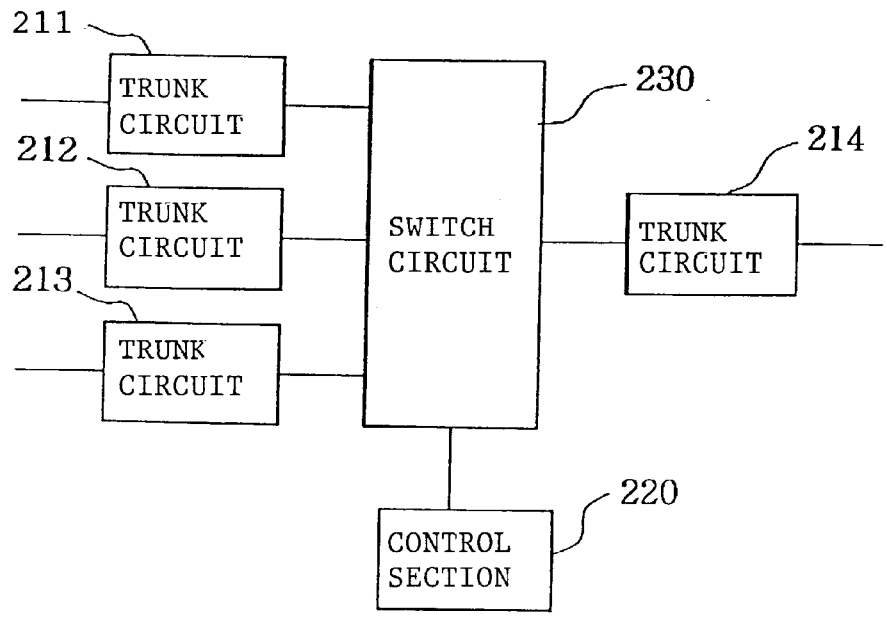
FIG. 5 is a block diagram showing one example of the configuration of a trunk node used in the bandwidth control method of the present embodiment.

Explanation is next presented regarding an actual example of a trunk node of the bandwidth control system of this embodiment. FIG. 5 is a block diagram showing an example of the configuration of a trunk node used in the bandwidth control method of this embodiment. This trunk node is made up of trunk circuits 211–214 connected to subscriber nodes or other trunk nodes; switch circuit 230 that interconnects these trunk circuits; and control section 220. Control section 220, which is a means of managing, manages the address table of each trunk circuit and sets the reserved bandwidths if necessary.

In this trunk node, the trunk circuit consults the address table based on the virtual channel number affixed to a received packet or the destination address of the packet upon receiving a packet signal, specifies the output port number, and supplies this received packet signal to switch circuit 230. Switch circuit 230 supplies the received packet to the trunk circuit on the output side based on this output port number. A trunk circuit that has been supplied with a received packet from switch circuit 230 effects bandwidth control corresponding to the set bandwidth value for the received packet that has been supplied.

Figure 2:
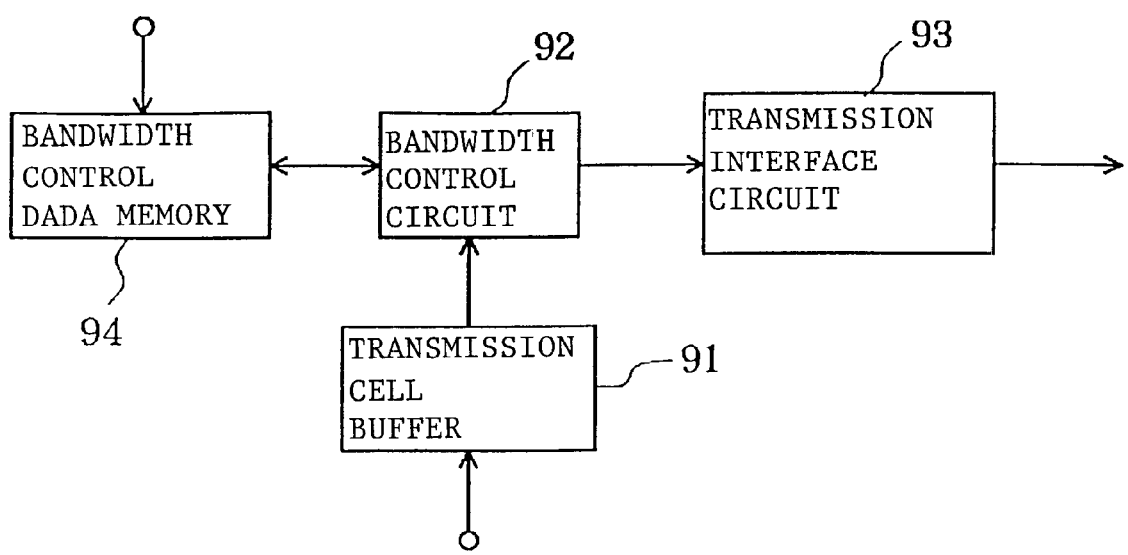
FIG. 2 is a block diagram showing an interface of the prior art having a peak rate bandwidth control capability.

In addition, bandwidth control at each trunk circuit can be realized by employing the circuit shown in FIG. 2 and described herein above. In such a case, at trunk circuit 214 which is connected to a higher-ranking trunk node, bandwidths are set by group for a plurality of virtual channels by bandwidth control circuit 92, which is a virtual channel group setting means. To explain using the example shown in FIG. 3, the bandwidth value 9 (the sum of bandwidth values to subscriber nodes 30 and 40) is set in the case of the trunk node 70 direction at the trunk circuit of trunk node 50 regardless of the number of lower-ranking subscriber nodes, bandwidth being controlled according to output route and not according to the final destination. In this case, the number of virtual channels set in the direction of trunk node 70 may be one, and "virtual channel number=1" is registered as information at bandwidth control data memory 94 of FIG. 2. If bandwidth control is carried out in group units by route in this way, the problem encountered in the prior art of a limit imposed on the number of subscriber nodes does not arise, and moreover, there is no need to use a large-capacity memory for bandwidth control data memory 94.

The above-described trunk node can be realized by a circuit that organizes by route the plurality of virtual channels set at a subscriber node. This type of virtual channel group setting can be realized using a simple priority control effected by the circuit configuration shown in FIG. 6 and described herein below.

Figure 6:
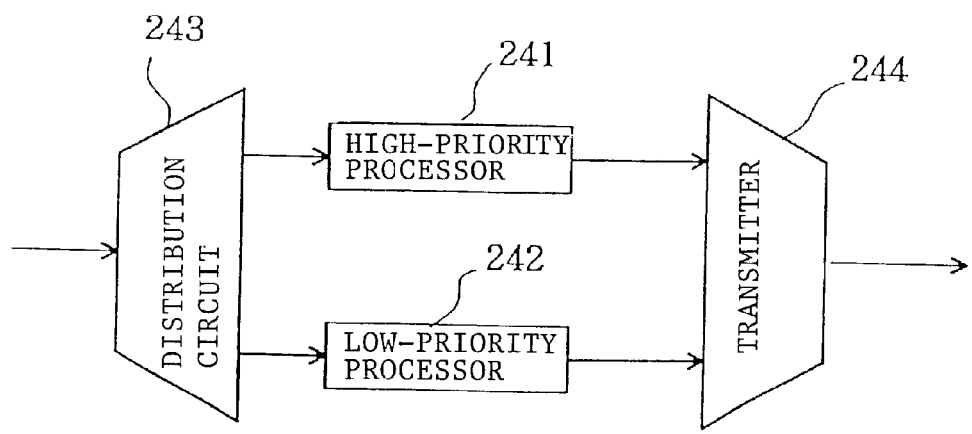
FIG. 6 is a block diagram showing an example of the configuration of a trunk circuit used in priority control.

In the trunk circuit shown in FIG. 6, distribution circuit 243 discriminates whether or not packets supplied from switch circuit 230 become the object of bandwidth reservation, traffic that is subject being supplied to high-priority processor 241 and traffic not subject being supplied to low-priority processor 242. Transmitter 244 preferentially sends traffic supplied to high-priority processor 241 to other trunk nodes or subscriber nodes. In this trunk circuit, there is inflow traffic for which bandwidths are stipulated at the subscriber node of call origin, and as a result, bandwidth reservation is realized though priority control. This configuration does not require intelligence such as the scheduler capability of bandwidth control circuit 92 of FIG. 2, and can therefore be realized at a lower cost.

Although the foregoing explanation related to bandwidth control over the interval from a source subscriber node as far as a destination subscriber node, the present invention is not so limited and can also be applied to bandwidth reservation between subscribers. For example, in trunk circuit 140 of FIG. 4, the source address and destination address of a packet are consulted, and if the packet is subject to bandwidth reservation, transmission is carried out using virtual channels that have been set in advance at this subscriber pair (destination subscriber and source subscriber). Bandwidth can thus be set by subscriber pair. Bandwidth reservation at trunk nodes can be performed grouped by output route, and the bandwidths of individual virtual channels need not be considered.

In addition to the above-described bandwidth control, for example, reserved bandwidths of links between the control sections of all subscriber nodes and trunk nodes can be centrally managed, links that can be set can be determined and bandwidths recalculated in the event of bandwidth requests for new lines, and calculation results may be notified to the control section of each node. Alternatively, as a control method based on decentralized control, in the event of a request for new settings, the control section of the request node may make inquiries for final destination information and desired bandwidth in succession as far as the final destination node, and the control section of each node may then perform setting of bandwidth reservation upon completion of the bandwidth reservation procedure.

Bandwidth reservation may also be performed in accordance with subscribers. Explanation of this type of bandwidth control is presented herein below based on the network shown in FIG. 1 and reserved bandwidths between subscriber nodes as shown in FIG. 3.

If the reserved bandwidth from subscriber 11 to subscriber 41 is made 3 and reserved bandwidth to subscriber 43 is made 4, subscriber node 10 assigns virtual channels toward subscriber node 40 on link 51 (reserved eleven (3+4+4) bandwidths), and moreover, virtual channels toward subscriber node 20 (reserved one bandwidth) and virtual channels toward subscriber node 30 (reserved five bandwidth) for communication from this subscriber 11. If no other traffic exists, the reserved bandwidths of virtual channels on link 75 is the sum of bandwidths toward subscriber nodes 30 and 40, i.e., 16 (5+11). Bandwidths are reserved for links as far as the destination subscriber node in the same manner. In other words, peak-rate setting is performed. On link 64, eighteen (11+7) bandwidths are reserved. on link 51, virtual channels from subscriber 11 to subscriber node 40, which includes subscriber 41 and 43, receive no influence from other traffic, and as a result, bandwidths as far as destination subscriber node 40 are reserved. In this way, bandwidths can be reserved by setting virtual channels according to destination subscriber node for a particular specified subscriber. An actual method of realizing this is explained below with reference to FIG. 4.

Trunk circuit 140 detects a packet signal from subscriber 11 received by way of subscriber interface circuit 111. Packets to subscribers arranged below subscriber node 40 are sent using virtual channels of the above-described reserved bandwidth 7. As in the above-described embodiments, the trunk system can be realized by the trunk nodes shown in FIG. 2.

As another embodiment using the present invention as described herein above, an effective method of using virtual channels can be provided by setting virtual channels having bandwidths in excess of the sum of communication for which bandwidths are reserved, and by combining, as communication having a low order of priority (low-priority communication), that communication of communication using these virtual channels that loses its bandwidth reservation for the sake of control that gives priority to data transfer from the above-described specified subscriber nodes.

As an example, high-priority communication for which bandwidths are reserved is accommodated on a virtual channel of 12 Mb/s such that the sum is 10 Mb/s. Regardless of how much low-priority communication traffic is accommodated, the high-priority communication is not affected, and as a result, the 10 Mb/s region can be collected from users.

In actuality, however, users of reserved bandwidths do not continuously use their allotted bandwidths, the average use being less than 10 Mb/s. In this case, if the average rate of use is, for example, 70%, 3 Mb/s can be assigned to low-priority use, with the result that 5 Mb/s of bandwidths can be assigned to low-priority use on average. In other words, a low-priority communication service can be established that can guarantee a throughput of 2 Mb/s and provide an average throughput of 5 Mb/s. In this way, high priority communication having a reserved bandwidth of 10 Mb/s and low-priority communication having an average throughput of 5 Mb/s can be provided using virtual channels or a transmission line of 12 Mb/s, thereby raising the value of a transmission line or virtual channel.

While preferred embodiments of the present invention have been described using specific terms, such description is for illustrative purposes only, and it is to be understood that changes and variations may be made without departing from the spirit or scope of the following claims.

What is claimed is:

1. A bandwidth control method that is carried out in a network in which a plurality of subscriber nodes accommodating a plurality of subscribers are each connected to each other by trunk nodes, comprising:

for the data transfer from subscriber nodes to trunk nodes, setting virtual channels to each of destination subscriber nodes that are relayed by way of said trunk nodes and controlling the transmission rate for the said virtual channels not to exceed the reserved bandwidth; and for the data transfer from trunk nodes to other trunk nodes or to destination subscriber nodes, establishing virtual channel groups according to route by organizing virtual channels that are relayed to said trunk nodes, setting the bandwidth capacity of virtual channel groups between trunk nodes and links from trunk nodes to a destination subscriber node equal to or greater than the sum of bandwidth of said virtual channels and giving said virtual channels the higher level priority to traffic which needs less quality of bandwidth service.

2. A bandwidth control method according to claim 1 further comprising:

for links from a subscriber node to a trunk node, assigning a virtual channel to a data transfer from a specific subscriber to a subscriber that is in the same destination subscriber node.

3. A bandwidth control method according to claim 1 further comprising:

using an asynchronous transfer mode as said virtual channel.

4. A bandwidth control method according to claim 1 that further comprises:

during transmission between trunk nodes and from a trunk node to a destination subscriber node, giving priority to data transfer from a specific subscriber node for communication having reserved bandwidth.

5. A bandwidth control method according to claim 4 that further comprises:
   for links between trunk nodes and links from trunk nodes to a destination subscriber node, setting virtual channels having bandwidths equal to or greater than the sum of communication having reserved bandwidth; and
   of communication that uses said virtual channels, giving a low order of priority to communication that loses reserved bandwidth for the purpose of control that gives priority to data transfer from said specific subscriber node.

6. A bandwidth control method according to claim 1 that further comprises:
   for links from a subscriber node to a trunk node, assigning a virtual channel to data transfer from a specific subscriber to a subscriber that is accommodated in the same destination subscriber node.

7. A bandwidth control method according to claim 1 that further comprises the use of an asynchronous transfer mode as said virtual channel.

8. A bandwidth control method according to claim 2 that further comprises the use of an asynchronous transfer mode as said virtual channel.

9. A bandwidth control method according to claim 3 that further comprises the use of an asynchronous transfer mode as said virtual channel.

10. A bandwidth control method according to claim 4 that further comprises the use of an asynchronous transfer mode as said virtual channel.

11. A bandwidth control method according to claim 5 that further comprises the use of an asynchronous transfer mode as said virtual channel.

12. A bandwidth control method according to claim 6 that further comprises the use of an asynchronous transfer mode as said virtual channel.

13. A bandwidth control system comprising:
   a network including a plurality of subscriber nodes accommodating a plurality of subscribers connected to each other by trunk nodes,
   wherein said subscriber nodes are each configured such that virtual channels are set according to a destination subscriber node, and bandwidth is reserved based on the virtual channels, and said trunk nodes are configured such that virtual channels are organized by route as virtual channel groups, and bandwidth is reserved based on the virtual channel groups, and said subscriber node comprises:
      a plurality of subscriber interface circuits that carry out communication with subscribers;
      a first trunk circuit that carries out packet communication with a trunk node by setting a virtual channel for each subscriber node through which communication is relayed by said trunk node, reserving bandwidth based on the virtual channels, and using a corresponding virtual channel;
      a first switch circuit that switches communication connections between said plurality of subscriber interface circuits and between these subscriber interface circuits and said first trunk circuit; and
      a first control device that, in addition to controlling communication connections by said switch circuit, administers said virtual channels and sets a capacity of reserved bandwidth; and
   said trunk node includes;
      a plurality of second trunk circuits that organize virtual channels that are relayed between other trunk nodes or destination subscriber nodes through that trunk node by route and make them virtual channel groups, and reserve bandwidth based on the virtual channel groups;
      a second switch circuit that switches communication connections between said plurality of second trunk circuits; and
      a second control device that, in addition to controlling communication connections by said second switch circuit, administers said virtual channel groups and sets the capacity of reserved bandwidth.

14. A bandwidth control system according to claim 13, wherein said subscriber node comprises:
   a plurality of subscriber interface circuits that carry out communication with subscribers;
   a first trunk circuit that carries out packet communication with a trunk node by setting a virtual channel for each subscriber node through which communication is relayed by way of said trunk node, reserving bandwidth based on the virtual channels, and using a corresponding virtual channel;
   a first switch circuit that switches communication connections between said plurality of subscriber interface circuits and between these subscriber interface circuits and said first trunk circuit; and
   a first control means that, in addition to controlling communication connections by said switch circuit, administrates said virtual channels and sets the capacity of reserved bandwidths;
   and said trunk node includes:
      a plurality of second trunk circuits that organize virtual channels that are relayed between other trunk nodes or destination subscriber nodes through that trunk node by route and make them virtual channel groups, and reserve bandwidth based on the virtual channel groups;
      a second switch circuit that switches communication connections between said plurality of second trunk circuits; and
      a second control means that, in addition to controlling communication connections by said second switch circuit, administrates said virtual channel groups and sets the number of reserved bandwidths.

15. A bandwidth control system according to claim 14 wherein said first trunk circuit that makes up said subscriber node comprises:
   first storage means in which is stored the maximum bandwidth information of each virtual channel that is set by a destination subscriber node; and
   virtual channel setting means that sets virtual channels of the maximum bandwidth information that has been stored in said first storage means;
   and wherein said second trunk circuit that makes up said trunk node comprises:
      second storage means in which are stored the maximum bandwidth information of virtual channel groups organized by route; and
      virtual channel group setting means that sets virtual channel groups in accordance with the maximum capacity of bandwidth stored in said second storage means.

16. A bandwidth control system according to claim 15 wherein said second trunk circuit that makes up said trunk node comprises:
   a distribution means that distributes transmission from specific subscriber nodes and transmission from other subscriber nodes; and transmission means that, for transmission that has been distributed by said distribution means, gives priority to transmission from specific subscriber nodes.

17. A bandwidth control method according to claim 2, further comprising:

using an asynchronous transfer mode as said virtual channel.

18. A bandwidth control system according to claim 13, wherein said first trunk circuit comprises:

a first storage device which stores a maximum bandwidth information of each virtual channel that is set by a destination subscriber node; and a virtual channel setting device that sets virtual channels of the maximum bandwidth information that has been stored in said first storage device, and wherein said second trunk circuit comprises:

a second storage device which stores the maximum bandwidth information of virtual channel groups organized by route; and a virtual channel group setting device that sets virtual channel groups in accordance with the maximum capacity of bandwidth stored in said second storage device.

19. A bandwidth control system according to claim 13, wherein said first trunk circuit comprises:

a first storage device which stores a maximum bandwidth information of each virtual channel that is set by a destination subscriber node; and a virtual channel setting device that sets virtual channels of the maximum bandwidth information that has been stored in said first storage device, and wherein said second trunk circuit comprises:

a transmission device that gives virtual channel groups that require high quality of bandwidth services higher priority than those that require less quality of bandwidth services.

* * * * *